D. H. GAGE.
Mowing-Machine.
No. 169,162.  Patented Oct. 26, 1875.
2 Sheets--Sheet 1.
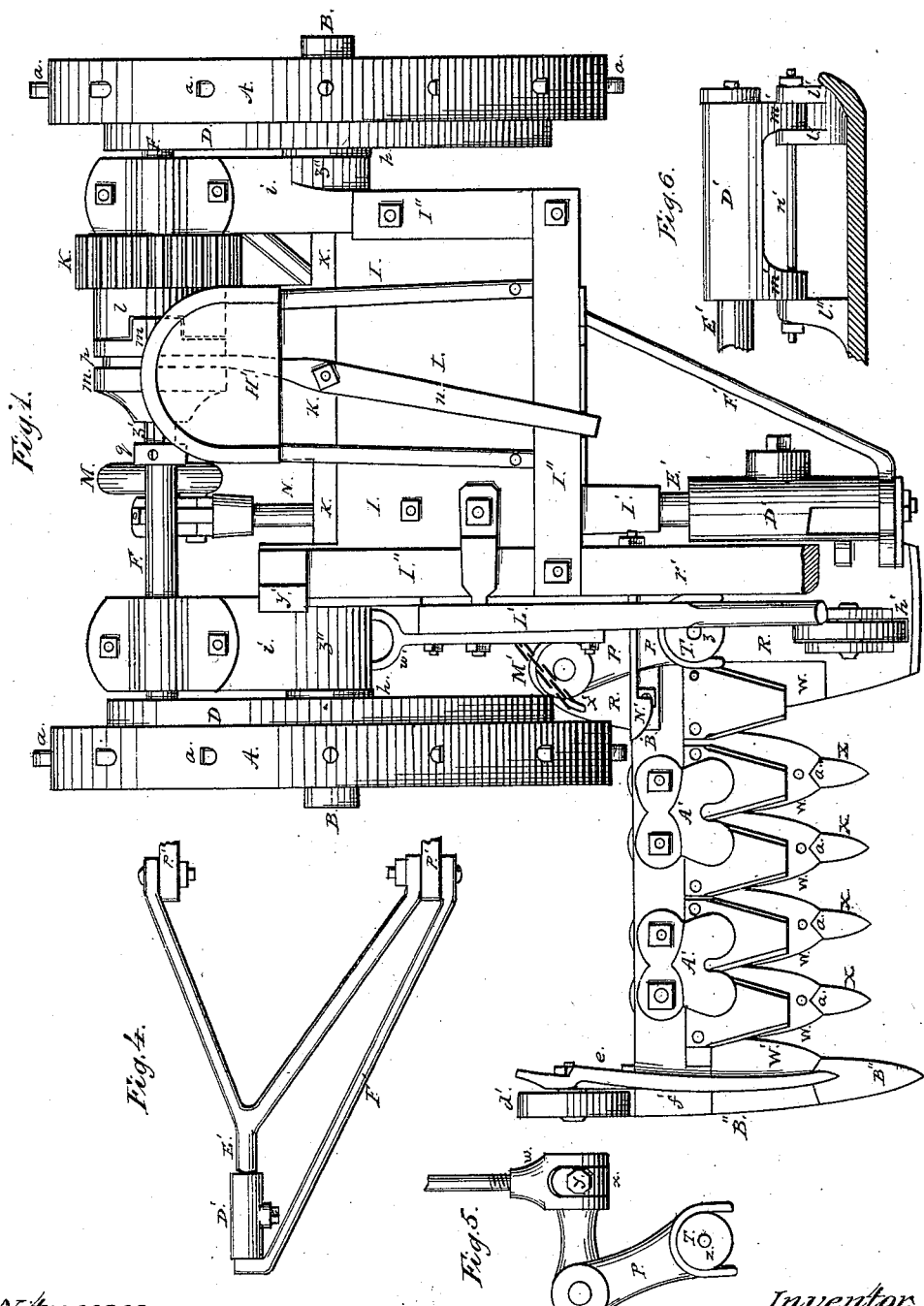

D. H. GAGE.
Mowing-Machine.
No. 169,162.
2 Sheets--Sheet 2.
Patented Oct. 26, 1875.
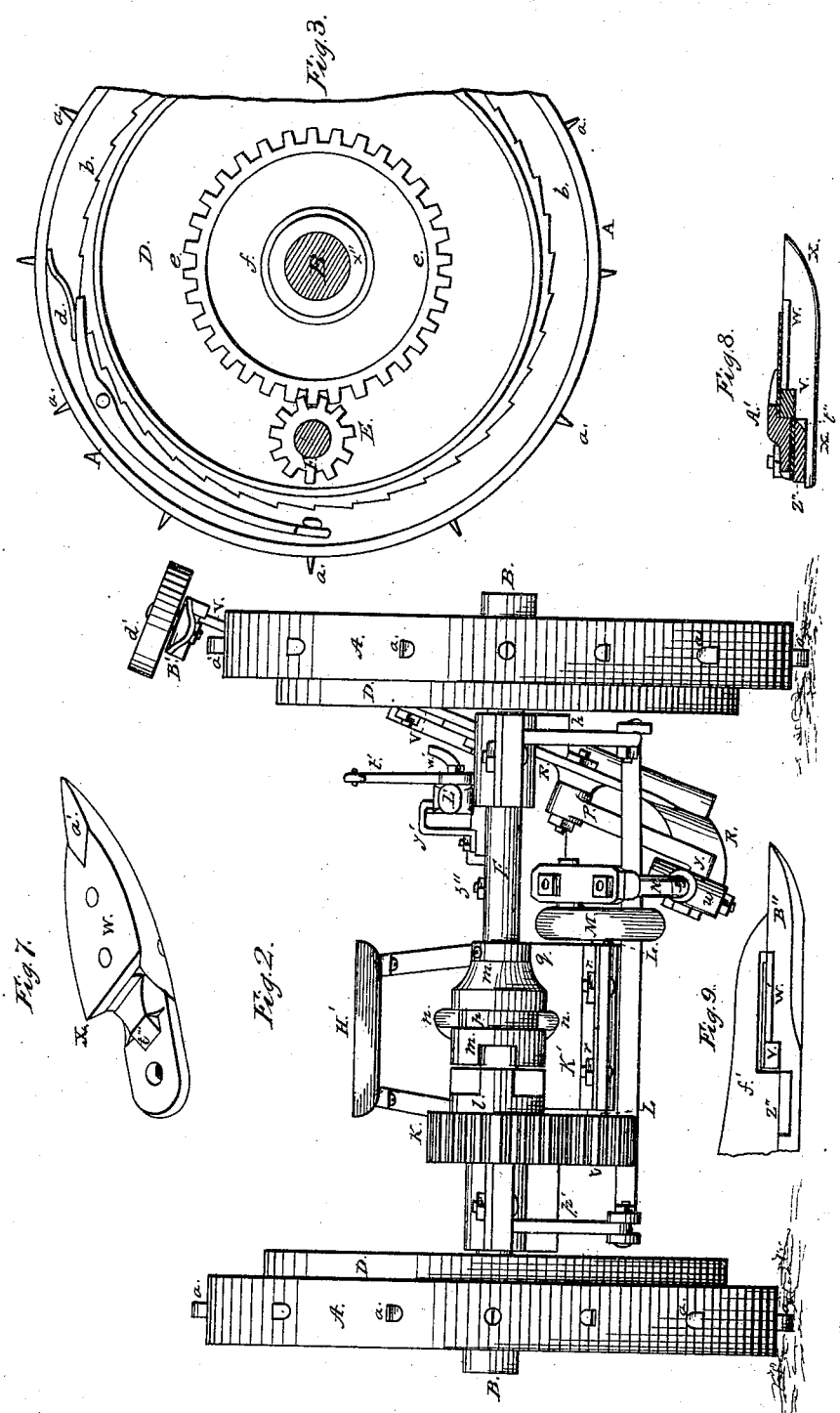
Witnesses.
Chas. B. Gill
W. Hendley
Inventor.
David H. Gage
by his attys
Cox & Cox

UNITED STATES PATENT OFFICE.

DAVID H. GAGE, OF DOVER, NEW HAMPSHIRE.

IMPROVEMENT IN MOWING-MACHINES.

Specification forming part of Letters Patent No. 169,162, dated October 26, 1875; application filed May 10, 1875.

*To all whom it may concern:*

Be it known that I, DAVID H. GAGE, of Dover, Strafford county, New Hampshire, have invented new and useful Improvements in Mowing-Machines, of which the following is a specification, reference being had to the accompanying drawings.

The invention relates to certain improvements in mowing-machines; and consists in the devices constructed and operating in the manner hereinafter set forth.

The object of the invention is to provide an efficient machine for cutting grass and analogous material.

Figure 1 is a plan or top view of a device embodying the elements of the invention. Fig. 2 is a rear elevation of same, showing the cutting mechanism suspended. Fig. 3 is a detached view of a part of the wheel A and connecting-wheels. Fig. 4 is a like view of the brace and draw rods. Fig. 5 is a similar view of the bell-crank and forked shoe. Fig. 6 is a side elevation, showing the hinging mechanism. Fig. 7 is a detached perspective view of the finger-guard X. Fig. 8 is a section through the longitudinal center of the finger-guard and appurtenances. Fig. 9 is a side elevation of the outer shoe.

A in the accompanying drawings represents the conveying-wheels, having upon their circumference the studs $a$, and at their centers the hub $x''$, extending inward a proper distance, and receiving the axle B, which extends across the device and connects the wheels A. The wheels A are flanged on their edges, and have placed within the flanges the wheels D, mounted loosely upon the hub $x''$, and having adjacent their outer edge the ratchet $b$, upon which operates the spring-pawl $d$, in such manner as to secure the wheel D with the wheel A as the latter moves forward. The wheels D are flanged on their inner edges, and have the cog-wheel $e$ placed about the annular shoulder $f$, which receives the hub $x''$, a washer, $h$, being placed on the axle B, adjacent the shoulder $f$. Thus the wheels A are mounted loosely upon the axle B, and the wheels D loosely upon the hub $x''$, and have but one conjoint movement, which is when the device is moving forward in a direct course, with the peripheries of the wheels A in the same plane. The wheel $e$ engages the pinion E, rigidly mounted upon the axle F.

From the above construction it is clear that when the device is turned to the right or left one of the wheels A operates its wheel D, while the other wheel D rotates, the pawl slipping over the ratchet $b$.

It is also obvious from the above description that when one of the wheels A enters a depression its movement is accelerated, communicating a corresponding increase of movement to its wheel D, and also to the opposite one, which rotates upon the hub $x''$ without affecting its wheel A.

The axle B extends across the device, its central parts passing through the elongated bearing $z''$ on the under side of the platform I, which is provided upon each end with the arms $i$, which extend rearward, having bearing-boxes at each extremity to receive and support the axle F at each side. Immediately adjacent one of the arms $i$, and working upon the axle F, is a gear-wheel, K, provided upon its side with the fixed clutch $l$, working on the same axle as the gear-wheel, the clutch and wheel being made in one piece. Operating upon the axle F is placed the sliding clutch $m$, having a slot to receive the feather $z'$ on the axle, and actuated by the forked lever $n$, the fork of which enters the annular groove $p$ in the clutch, the clutches $l$ and $m$ being arranged so as to properly engage. The operation of the lever $n$ is regulated by a rack placed adjacent the drivers' seat, so that the lever can be operated by the feet, the motion of the lever being limited by the collar $q$, provided with a set-screw, and encompassing the axle F. Secured to the center of the rear of the axle B, opposite the platform I, and depending somewhat downward, is placed the plate K, provided with a groove and the boxes $r$, which form the bearings of the axle L, to which, at one end, is rigidly secured the gear-wheel $t$, the teeth of which engage the cog-wheel K, the other end of the axle L being provided with the wheel M, to which the pitman-rod N is attached eccentrically. The pitman-rod extends forward at right angles to, and a proper distance below, the axle B, its forward end being threaded, and entering the rear end of the forked shoe $w$, provided with a female thread to receive the thread on the pitman-rod, so as to preserve the position of the shoe, and still permit it to turn upon the end of the rod. Between the forks of the shoe $w$ is pivoted transversely a packing-block, $x$, in which rotates vertically the post $y$ on one end of the bell-crank, the post being secured in position by a nut. The angle of the bell-crank is pivoted to and upon an annular shoulder on the rear of the shoe R. The front arm of the bell-crank is forked, and encompasses the grooved friction-wheel T, which rotates on the vertical axle $z$, secured upon the end of the sickle-bar V, which has teeth secured on its upper surface, and operates upon the cutter-bar in a manner hereinafter set forth, the teeth moving in juxtaposition to and above the ledger-blades W, secured to the upper surface of the finger-guards X, in such manner that the cutting-edges of the teeth shall cross the ledger-blades W in close relation. The shoes at each end of the cutter-bar are provided with ledger-blades W′, sharpened upon one edge only, while those on the finger-guards are sharpened on both, and flare upward and outward beyond the edges of the finger-guards. The finger-guards X are recessed on the upper surface of their rear parts, the rear portion of the recessed parts being bolted in line to the cutter-bar $Z''$, provided with suitable apertures $t''$, to receive the shoulders $t'''$ on the finger-guard X, the front upper portion of which rises above the level of the cutter-bar, and is provided with a recess having in it the angular piece $a'$, to receive the ledger-blades W, the edges of which protrude over the edges of the finger-guards, the back of the ledger-blades W, and that portion of the finger-guards immediately below the rear edges of the ledger-blades, forming the front of the channel wherein the bar of the sickle moves.

The guide-plates A′ are secured in line rigidly at their rear to the cutter-bar by bolts, which pass through the cutter therefor, finger-bar B, and the rear of the guide-plates, which are lower at their rear, their front edges forming the rear of the channel in which the sickle-bar V moves. The front portion of the guide-plate extends over the rear of the sickle-teeth, serving to keep them in position. The channel wherein the sickle-bar moves is further formed by the plate B′, which is bolted to the shoe R, below the front arm of the bell-crank P. At the outer end of the cutter-bar is provided another shoe, B″, furnished at its rear with the supporting-wheel $d'$, working on an axle fixed to the vertical flange $f$. An upright flange, $f'$, extends forward upon the upper surface of the shoe, being cast vertically thereon, and is properly recessed on its lower edge to permit the operation of the sickle, and strip the same, thus preventing clogging. The front part of the shoe B″ forms a finger-guard, and is similarly provided with a ledger-blade, W′, which, however, is sharpened only on the inner edge. The shoe R curves upward in front, and is there provided with the supporting-wheel $h'$, adjacent which, upon the edge of the shoe, are placed the ears $l'$, while at the edge, and near the rear of the shoe, is placed another ear, $l''$, the axle-apertures in the ears $l'$ and $l''$ being at the same height. At the front end of the forked rod is provided the sleeve D′, secured on the rod E′, and provided with the depending ears $m'$, which are connected by the rod $n'$ with the ears $l'$ $l''$, forming the hinge upon which the cutting mechanism swings. The brace-rod F′ extends from the extremity of the rod E′, beyond the sleeve D′, to the rear of the device, where, to one of the flanges, $p'$, provided below the arms $i$, the rear end of the rod F′ is secured, the rear extremities of the forked rod E′ being attached to the flanges on each side. The platform I is provided with a driver's seat, H′, which is located above the center of the axle F, and has above the rod E′ a bar-spring, I′, which impinges upon the rod, and operates against the rear of the sleeve D′, to prevent the devices jarring. The platform I is surrounded by the frame I″, the rear of the tongue $r'$ forming one side of the frame, whereat is pivoted the lever L′, provided with the hooked arm $t'$ for holding, and below it the forked arm $w'$ for sustaining, the chain M′, connected with the eye $x'$ on the rear of the shoe R, the purpose of the mechanism last described being to raise or lower the cutting devices, a catch, $y'$, being provided to hold the lever in a depressed position as it elevates the cutting mechanism. Near the base of the tongue is provided the spring-catch N′, to sustain the cutting devices when elevated by the operation of the lever.

To perform the operation of mowing, the clutches are engaged by operating the lever $n$ so that the wheels $k$ $t$ engage. Then, when the machine is started, the wheel $o$ is rotated, and, engaging the pinion E, communicates movement to the axle F, and so to the pitman-rod, bell-crank, and sickle.

To transport the device it is only necessary to release the clutches, which prevents any movement of the axle L and its attachments.

The machine may be backed readily, since the reverse movement of the wheels causes the spring-pawl to pass over the ratchet-teeth without effect.

The weight of the shaft L and adjunctive elements serves to balance that of the cutting mechanism when the latter is attached to the platform I.

What I claim as my invention, and desire to secure by Letters Patent, is—

1. The combination of the pitman N with the shoe $w$, having the packing-block $x$ pivoted therein, and connected with the bell-crank P by the post $y$, substantially as set forth.

2. The combination of the shoe $w$, block $x$, post $y$, and crank P with the vertical axle $z$, encompassed by the friction-wheel T, substantially as expressed.

3. The forked rod E', pivoted at its rear ends to the flanges $p'$, its front end forming an axle for the sleeve D', in combination with the brace-rod F', substantially as set forth.

In testimony that I claim the foregoing improvements in mowing-machines, as above described, I have hereunto set my hand and seal this 20th day of April, 1875.

DAVID H. GAGE. [L. S.]

Witnesses:
SAML. M. WHEELER,
JOHN E. BICKFORD.